P. C. HEWITT.
VAPOR ELECTRIC APPARATUS.
APPLICATION FILED SEPT. 9, 1912.

1,188,773.

Patented June 27, 1916.

Witnesses:
C. L. Belcher
Thos. H. Brown

Inventor
Peter Cooper Hewitt
By his Attorney
Charles A. Terry.

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC APPARATUS.

1,188,773.            Specification of Letters Patent.     Patented June 27, 1916.

Application filed September 9, 1912. Serial No. 719,362.

*To all whom it may concern:*

Be it known that I, PETER COOPER HEWITT, a citizen of the United States, and resident of Ringwood Manor, county of Passaic, State of New Jersey, have invented certain new and useful Improvements in Vapor Electric Apparatus, of which the following is a specification.

This invention relates to vapor electric apparatus and more particularly to rectifying apparatus for converting alternating current into direct current.

The invention has for its object to provide an improved rectifier of this character which shall be adapted to convert large amounts of electrical energy and in which improved arrangements are provided for increasing the efficiency and insuring the dissipation of heat generated at the electrodes, and for preventing any portion thereof from being exposed to an undesirably high temperature due to the concentration of the current traversing the apparatus at a small portion of the surface area of the electrode.

According to the present invention the negative electrode of the device, which is composed of material of such a nature that the particles thereof unite physically and electrically upon contact with one another after separation, is provided with a solid body wholly or partly immersed in the electrode so that its upper surface projects slightly above the general surface level of the electrode and is wetted thereby. The object of this arrangement is to determine the position of the negative flame at the surface of the electrode when the apparatus is in operation, the portion of the body projecting above the level of the surface of the electrode serving to increase the linear breadth of the negative flame in contact with the electrode and to prevent the tendency of the flame to burrow below the general surface of the electrode and to detach and scatter particles of the electrode's material. The solid body above referred to should also be composed of material having a high thermal conductivity, in which case the body will also serve to transfer heat from the negative electrode to a radiating or dissipating surface and thereby reduce the temperature of the electrode.

The invention is illustrated in the accompanying drawings, of which—

Figure 1:
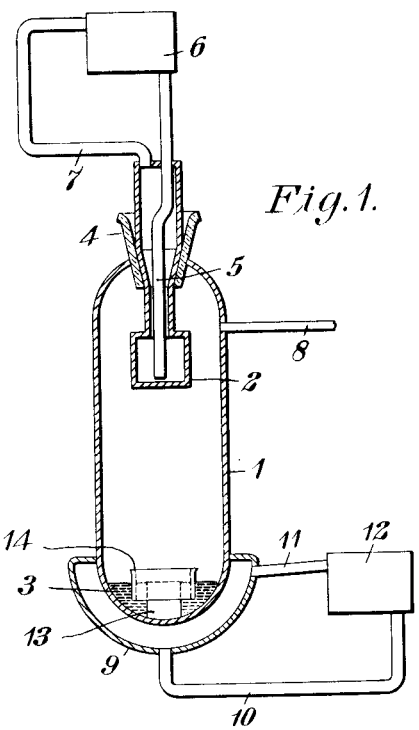
Figure 2:
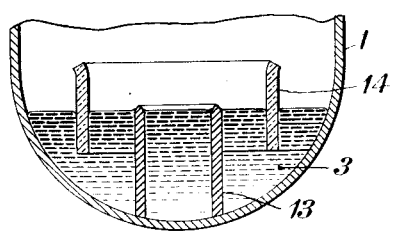

Figure 1 is a diagrammatic view in side elevation partly sectional of a preferred form of vapor apparatus constructed in accordance with the invention. Fig. 2 is a view on an enlarged scale of that portion of the apparatus of Fig. 1 comprising the negative electrode and its coöperating arrangements, Fig. 3 being a plan view on the line III—III of Fig. 2. Fig. 4 is a view similar to Fig. 1 but illustrating only a portion of a modified form of rectifier, Fig. 5 being a plan view of the negative electrode of the rectifier shown in Fig. 4.

Figure 3:
Figure 4:
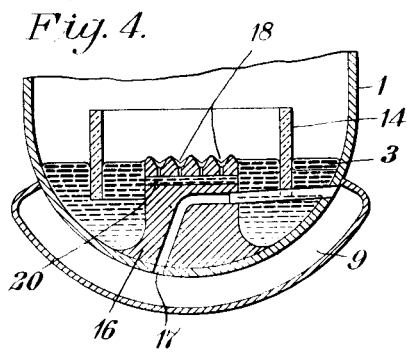

Referring now to Figs. 1 to 3 inclusive, the rectifier comprises a container or envelop 1 provided at its upper end with a positive electrode 2 and at its lower end with a negative electrode 3 comprising a body of mercury or other conducting material capable of reuniting with itself after separation. The positive electrode 2 comprises a body of conducting material between which and the container wall is interposed an insulating bushing 4 of porcelain or other suitable material. The interior of the electrode 2 may be provided with a tube 5 extending nearly to the lower end of the electrode 2 and connected at its opposite end to a reservoir 6 containing oil or other suitable cooling medium. The tube 5 enters the reservoir 6 at or near the base thereof, and a second tube 7 leads from the upper portion of the reservoir 6 to the top of the hollow electrode 2, so that a continuous circulation of the cooling medium from the reservoir 6 through the electrode 2 is maintained when the device is in operation, owing to the heat generated in the lower portion of the electrode 2. The cooling fluid may be circulated by a pump or other means; alternatively a mass of metal may be provided in contact with the positive electrode and having a large radiating surface.

The container 1 is provided with an outlet pipe 8 by means of which the interior of the container is exhausted in any suitable manner, and the lower portion of the container in which is located the negative electrode 3 is surrounded by a cooling jacket 9 which is connected by means of inlet and outlet tubes 10 and 11 respectively with a second reservoir 12 similar to the reservoir 6. The negative electrode is provided with an annular body 13 having a higher thermal conductivity than the material constituting the electrode and so arranged that it conducts heat from the electrode to a point in the container adjacent to the cooling jacket. The material of which the body 13 or the upper portion thereof is composed is of such a nature as to be wetted by the liquid electrode 3 and is of such dimensions that its upper edge is slightly above the level of the liquid electrode 3, so that the surface of the liquid at the edge of the body assumes the form of a meniscus. An insulating shield 14 of larger diameter than the ring 13 and arranged to surround it is provided for the purpose of localizing the arc and preventing any spray from the negative electrode when the rectifier is in operation from reaching the side walls of the metal container 1, so as to insure the limitation of the arc discharge from the negative electrode within the limits imposed by the insulating shield 14.

The operation of this form of the apparatus is as follows: The rectifier having been started into operation by any suitable means, the heat generated at the positive electrode 2 is transferred to the oil within the interior of the electrode which as its temperature increases rises by means of the tube 7 to the oil reservoir 6, being replaced by cooler oil reaching the interior to the positive electrode 2 by means of the pipe 5. The heat generated in the positive electrode is thus dissipated by means of the cooling reservoir 6 and the temperature of the positive electrode is therefore maintained at any value suitable for proper operation of the rectifier. A similar action occurs at the negative electrode 3, heat being generated at the point over which the negative flame is situated; the transfer of this heat from the surface of the conducting liquid material constituting the electrode is facilitated by the presence of the body 13 which serves to conduct heat from the surface of the liquid electrode to the base of the container wall adjacent to the cooling jacket, where it is transferred by the circulatory action of the cooling medium to the reservoir 12, and thence dissipated. Owing to the meniscus formed by the upper edge of the ring 13 the current stream at the negative electrode is not from a point on the surface but is distributed over the meniscus, a gap 15 in the ring 13 being provided to enable the discharge to spread to the interior edge of the meniscus inclosed by the ring in the event of the initial discharge occurring at a point external to this ring or vice versa. The ring 13 in fact serves to determine the location of the current stream to greatly increase its linear dimensions; and prevent its concentration at a point of the surface of the negative electrode 3, at the same time providing increased facilities for transferring the heat generated in the electrode to the cooling medium, and prevents the physical disturbance on the surface of the electrode.

Figure 5:
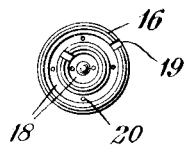

Referring now to Figs. 4 and 5, a modification is illustrated in which the ring 13 is replaced by a body 16 projecting upward from the base of the container wall 1 and having on its upper surface a series of grooves 18 so as to form a plurality of menisci, the several grooves being connected by passages so as to enable the arc discharge to spread from one surface to another of the grooves; further passages 20 may be provided in the interior of the body connecting the menisci in order to supply them with fresh liquid material to replace that driven off. The member 16 is provided with one or more passages 17 within its interior which communicates with the cooling jacket 9 provided for the negative electrode, so that a continuous circulation of cooling medium through the passage 17 is obtained whereby the heat generated within the negative electrode can be effectively dissipated.

I claim as my invention:

1. Vapor electric apparatus comprising as a part thereof an electrode composed of material of such a nature that the particles unite physically and electrically upon contact with one another after separation, and a solid body in contact throughout its full horizontal diameter with the inner wall of the apparatus and extending therefrom to a position where its upper surface projects slightly above the general surface of the electrode and is wetted by the latter, the object being to determine and equalize the position and distribution of the negative flame at the surface of the electrode.

2. Vapor electric apparatus comprising as a part thereof a self-reconstructing electrode, and a solid body having a high thermal conductivity in contact throughout its full horizontal diameter with the inner wall of the apparatus and extending therefrom to a position where its upper surface projects slightly above the general surface of the electrode and is wetted by the latter.

3. Vapor electric apparatus comprising as a part thereof a self-reconstructing electrode and a solid body the upper surface of which is grooved horizontally, the said body extending from the inner wall of the apparatus to a position where its grooved upper surface projects slightly above the general surface of the electrode and is wetted by the latter.

4. Vapor electric apparatus comprising as a part thereof a self-reconstructing electrode and a discontinuous solid body extending from the inner wall of the apparatus to a position where its upper surface projects slightly above the general surface of the electrode and is wetted by the latter, a part of said solid body being in contact throughout its full horizontal diameter with the said inner wall.

5. Vapor electric apparatus comprising as a part thereof a self reconstructing electrode and a solid body extending from the inner wall of the apparatus to a position where its upper surface projects slightly above the general surface of the electrode and is wetted by the latter, the said upper surface comprising a number of horizontal grooves forming corresponding depressions connected by means of transverse grooves or passages.

6. Vapor electric apparatus comprising as a part thereof a self-reconstructing electrode, and a solid body extending from the inner wall of the apparatus to a position where its upper surface projects slightly above the general surface of the electrode and is wetted by the latter, the said solid body being provided with horizontal passages supplying vaporizable material from the electrode.

7. Vapor electric apparatus comprising as a part thereof a self-reconstructing electrode, a solid heat conducting body projecting above the surface of the electrode and a cooling jacket surrounding the container of the said electrode, the said heat conducting body being provided with passages communicating with the said jacket, and the jacket containing a circulating medium such as oil.

8. Vapor electric apparatus comprising as a part thereof a self-reconstructing electrode and a solid body within the same, the upper surface of the solid body being slightly above the general surface of the electrode, whereby a meniscus is formed around the said body, and a shield of larger diameter plunged into the electrode and surrounding the upper part of the said solid body.

9. Vapor electric apparatus comprising as a part thereof a self-reconstructing electrode and a solid body within the same, the upper surface of the solid body being slightly above the general surface of the electrode, whereby a meniscus is formed around the said body, and a shield of larger diameter plunged into the electrode and surrounding the upper part of the said solid body, the said shield being provided with a gap for permitting an accidental discharge from outside the shield to spread to the edge of the inner meniscus around the solid body.

Signed at New York, in the county of New York and State of New York, this 4th day of September, A. D. 1912.

PETER COOPER HEWITT.

Witnesses:
   Wm. H. Capel,
   Thos. H. Brown.